J. J. WALLEY.
BRACE FOR AXLE HOUSINGS IN AUTOMOTIVE CARS.
APPLICATION FILED MAR. 17, 1919.
1,389,083. Patented Aug. 30, 1921.
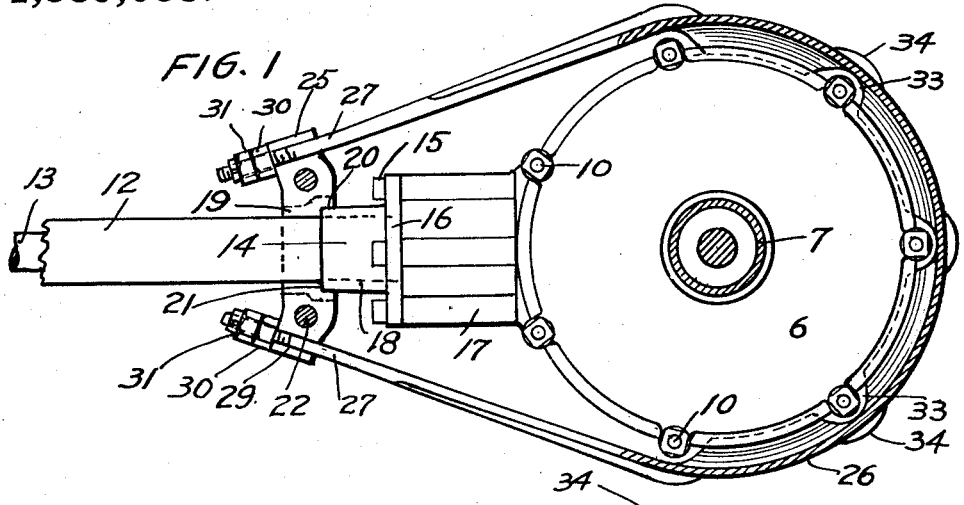
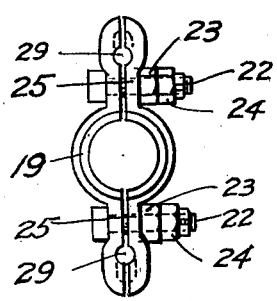
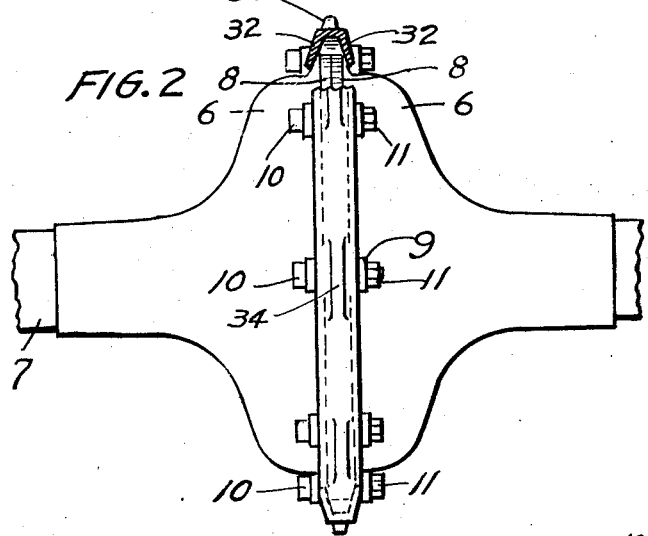
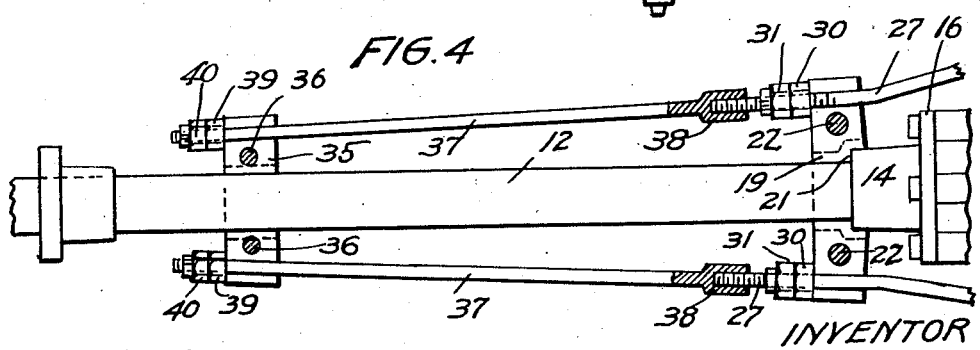
WITNESS.
J. Jessen
INVENTOR
JAMES J. WALLEY.
BY Paul & Paul
HIS ATTORNEYS.

UNITED STATES PATENT OFFICE.

JAMES J. WALLEY, OF ANOKA, MINNESOTA, ASSIGNOR OF ONE-HALF TO CHARLES R. PORTER, OF ANOKA, MINNESOTA.

BRACE FOR AXLE-HOUSINGS IN AUTOMOTIVE CARS.

1,389,083.  Specification of Letters Patent.  Patented Aug. 30, 1921.

Application filed March 17, 1919. Serial No. 283,024.

*To all whom it may concern:*

Be it known that I, JAMES J. WALLEY, a citizen of the United States, residing at Anoka, county of Anoka, State of Minnesota, have invented certain new and useful Improvements in Braces for Axle-Housings in Automotive Cars, of which the following is a specification.

My invention relates to the housings for the driven axle, differential gears, driving shaft and bearings, as usually constituting the driving or rear axle assembly of automobiles or other power vehicles. These housings and tubings in the manufacture of many cars are difficult to securely join together to withstand the severe strain and sudden jolts to which they are naturally subjected. As a consequence of insecure construction, loosening of bolts, dislocation of parts and breakage of gears and other parts connected with this part of the machines are of frequent occurrence and the object of my invention is to provide a simple and inexpensive means for securely clamping and bracing the several housings and tubings together in a rigid unit and hold the parts rigidly together even if some of the pre-existing bolts or fastenings should become loose.

My invention while capable of general application is particularly designed for a Ford car.

A further object is to provide bracing means of this description that can be applied to rear or driving axles of any power car without the necessity of making any structural changes in the axle or shaft bearings.

My invention consists in the constructions and combinations as hereinafter described in the specification and more particularly pointed out in the claim, taken in connection with the accompanying drawings, in which, Figure 1 is a sectional view of a rear axle and drive shaft housings of a standard automobile, having my invention applied thereto.

Fig. 2 is a rear elevation of the differential housing, showing the bracing yoke in partial section.

Fig. 3 is an end elevation of the clamp to which the bracing yoke is connected.

Fig. 4 is a modified form of brace adapted to secure the drive shaft housing in its support.

In the drawings, 6—6 represent the two sections of the ordinary differential gear housing of the axle 7, having flanges 8 and bolt bosses 9. Threaded bolts 10 pass through the bosses 9 and are provided with the usual threaded nuts 11 for clamping the two sections of the housing together. 12 is the conventional drive shaft tubing, through which the drive shaft 13 having a gear meshing with the differential gearing (not shown) within the housing 6. The tubing 12 is connected to the flanged collar 14, usually by brazing, and bolts or studs 15 hold the flange 16 of the collar 14 to the usual roller bearing housing 17 and to the axle housing 6. The brazed joint 18 and the connection of the roller bearing housing to the axle housing is generally more or less insecure and I provide a clamp collar, made in two sections 19, closely fitting around the tubing 12 and having an enlarged annular recess 20 of any suitable depth, fitting the collar 14. The bottom of the recess 20 forms an annular shoulder 21 normally abutting the end of the collar 14 and firmly held against the collar, as will hereinafter appear. Bolts 22 having clamping nuts 23 and locking nuts 24 pass through the flanges 25 of the clamp collars 19, by which means the collars 19 may be firmly clamped around the tubing 12 and flanged collar 14. A channel or V-shaped semi-annular yoke 26, preferably drop forged of a suitable high tensile grade of steel, is fitted to the outline of the axle housing 6 and the yoke terminates in converging rounded and threaded ends 27, adapted to pass through holes 29 in the flanges of the clamping collars 19 and provided with clamping nuts 30 and lock nuts 31. The semi-annular portion of the yoke 26 consists of the V-shaped ribs 32 adapted to straddle the flanges 8 of the axle housing 6, as shown in Fig. 2, and as the nuts 30 are tightened, the angular form of the channel ribs 32 draws the flanges more firmly together, relieving the strain on the bolts 10 and holding the housing firmly together even in case some of the nuts 11 should become loose. At the same time in tightly drawing up the nuts 3, the drive shaft tubing 12, flanged collar 14 and roller bearing housing 17 are firmly drawn up against the axle housing 6, securely holding the parts together and forming a rigid brace against bending or dislocation of the parts. In order to avoid interference of the bolt bosses 9 with the channel ribs 32 I prefer to cut away the ribs at 33 to make room for the bosses and I may provide reinforcing ribs 34 to strengthen the yoke where the flanges are removed. By extending the flanges around the bolts and nuts, the cut-away of the flanges may be avoided and at the same time the nuts may be protected from working loose or coming off entirely. In motor trucks or other similar vehicles where the drive gear tubing 12 is extra long, I prefer to provide an additional clamp 35, fastened to the tubing 12 near its inner end by bolts 36 and connected by the reach rods 37 to the threaded yoke ends 27 by means of internally threaded heads 38. The rods 37 pass through the clamp 35 and are provided with tightening nuts 39 and lock nuts 40. By tightening the nuts 39 a rigid brace is provided for the tubing 12 to keep it from bending in addition to the bracing effect of the clamps 19 and yoke 26.

It is evident that various changes in the details of construction of the brace parts may be made without departing from the principle of the invention, and I do not therefore strictly confine myself to the construction shown.

I claim as my invention:

The combination, with a rear axle, a differential gearing housing and drive shaft housing secured thereto, of a strap embracing and seated on said differential gearing housing, a clamp mounted on said drive shaft housing and having sockets to receive the ends of said strap, a second clamp mounted on said drive shaft housing and means connecting said second clamp with the ends of said strap.

In witness whereof, I have hereunto set my hand this 7th day of March, 1919.

JAMES J. WALLEY.